Patented May 11, 1943

2,319,190

UNITED STATES PATENT OFFICE 2,319,190

MINERAL OIL COMPOSITION

Orland M. Reiff, Woodbury, N. J., assignor to Socony-Vacuum Oil Company, Incorporated, New York, N. Y., a corporation of New York No Drawing. Application April 20, 1940, Serial No. 330,694

10 Claims. (Cl. 252—48)

This invention has to do in a general way with mineral oil compositions and is more particularly related to mineral oil compositions of the lubricant type to which an agent has been added in a minor proportion for the purpose of improving the oil in certain respects. It is an object of this invention to provide a novel class of mineral oil addition agents which will improve one or more important properties of a mineral oil fraction. It is a further object to provide mineral oil compositions containing such improving agents.

In my co-pending application Serial No. 222,755, filed August 3, 1938 (Patent 2,197,835), of which this application is a continuation in part, I have described as mineral oil addition agents, a general class of metalorganic compounds which are characterized by the presence of a wax substituted aryl nucleus, such addition agents being multifunctional in that they are effective to reduce the pour point, improve the viscosity index and retard the deleterious effects of oxidation in the oil to which they are added. The present invention is predicated upon the discovery that the sulfur derivatives or, more specifically, the sulfides (monosulfides and polysulfides) of metalorganic compounds of the type disclosed in the aforesaid application are improved in certain respects over the corresponding metalorganic compounds from which such sulfides may be considered as having been obtained. In addition to the sulfides or sulfur derivatives, my invention also contemplates the corresponding derivatives of the related elements selenium and tellurium.

More specifically, the present invention is concerned with metalorganic condensation products of sulfur, selenium or tellurium corresponding to the alkyl substituted aryl ether acid salts disclosed in co-pending application Serial No. 229,876, filed September 11, 1938 (Patent No. 2,198,292), in which I am a co-inventor. The addition agents of the present invention, like those of this last mentioned co-pending application, are characterized by the presence of an aromatic nucleus in which at least one nuclear hydrogen atom is substituted with an oil solubilizing alkyl group and wherein at least one other nuclear hydrogen atom is substituted with an ether acid group wherein the carboxyl hydrogen is replaced with its equivalent weight of metal.

The addition agents of the present application are distinguished from those of the aforesaid application Serial No. 229,876, in that at least two of the alkylated aryl ether acid salt groups are interconnected by at least one atom of an element selected from the group consisting of sulfur, selenium and tellurium. Through the introduction of sulfur, for example, in the manner or manners to be hereinafter described, I obtain what may be broadly termed a sulfide of an alkyl substituted aryl ether carboxylic acid salt in which the carboxyl hydrogen is substituted with is equivalent weight of metal.

This general class of sulfides of metal salts distinguishes over the corresponding class of metal salts disclosed in application Serial No. 229,876 in that they have increased effectiveness in retarding the deleterious effects of oxidation in the oil. In the preferred multifunctional class of these addition agents I have found that the sulfides, in general, possess improved pour depressant and viscosity index improving properties as well as improved antioxidant properties over the corresponding salts of the aforesaid co-pending application. The improved antioxidant properties are particularly significant in retarding the development of acidity in certain types of oils and under certain conditions of use.

The property of oil miscibility, that is of remaining uniformly suspended in the oil under normal conditions of handling and use, is imparted to the condensation products contemplated herein by the alkyl substituent on the characterizing aryl nucleus. This substituent, therefore, should be derived from an aliphatic hydrocarbon of sufficient solubilizing value to render the condensation product oil miscible. For obtaining the preferred product having multifunctional properties, the alkyl substituent should correspond to an aliphatic hydrocarbon having at least twenty carbon atoms. Petroleum wax constitutes a preferred source for these so-called heavy alkyl substituents and for that reason the preferred multifunctional compounds may be hereinafter designated as "wax" substituted. It is to be understood, however, that the term "wax" as used in this regard is not restricted to substituent groups derived from petroleum wax but is intended to include substituent groups derived from any pure aliphatic hydrocarbon or mixture thereof or any predominantly aliphatic material which is in character or constituents similar to the constituents of petroleum wax.

The condensation products of alkyl-substituted aryl ether acid salts of the type contemplated herein may be characterized by the general formula:

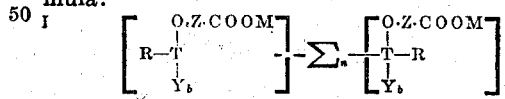

in which T represents a mono-cyclic or polycyclic aromatic nucleus; Σ represents sulfur, selenium or tellurium and $n$ represents a whole number from one to four. The group O·Z·COOM represents what I may term an ether acid salt group wherein Z represents an alkyl or an aryl radical and M represents the hydrogen equivalent of a metal. This group may also be broadly defined as an ether carboxylic acid group in which the carboxyl hydrogen is substituted with its equivalent weight of metal. R represents at least one oil solubilizing alkyl group, which for the preferred multifunctional condensation products is at least one alkyl group having at least twenty carbon atoms hereinabove identified as a "wax" group. In addition to the oil-solubilizing alkyl group (R), the characterizing aryl nucleus may contain residual hydrogen, a part or all of which may, in turn, be substituted with substituents having a positive or negative or neutral oil-solubilizing effect. Such residual hydrogen or substituents are indicated by $Y_b$ in the general formula. Y is defined as having been selected from the group consisting of hydrogen, hydroxyl, ester (organic or inorganic acyl groups), keto, alkoxy, alkyl sulfide, aryl sulfide, aroxy, ether alcohol, aldehyde, thioaldehyde, oxime, amido, (organic or inorganic acyl groups), thioamido, carbamido, aralkyl, aryl, alkaryl, halogen, nitroso, amino, nitrosamino, amidino, imino, N-thio, diazo, hydrazino, cyano, azoxy, azo and hydrazo radicals; and $b$ represents the number of Ys and is equal to zero or a whole number corresponding to available hydrogens on the nucleus T not substituted with R, $O \cdot Z \cdot COOM$ and $\Sigma_n$.

For purposes of definition and description herein the group —O—Z—COOH shall be designated as the "ether carboxylic acid group" and the term "aryl ether carboxylic acid salt" is, as indicated above, inclusive of compounds wherein the group typified by Z in the general formula is either aryl or alkyl.

As aforesaid, Z may be an aromatic nucleus and in that event this aryl nucleus may have R and Y substituents and the condensation with the linkage $\Sigma_n$ may take place between the aryl nucleus or nuclei of such a Z group, and the foregoing general formula is intended to include such modified derivatives. When Z is aliphatic, Y substituents may also be present, excepting those of strictly aromatic origin, such as those resulting from diazotization, for instance.

In general, it appears that any metal may be employed as the metal M in compounds or condensation products of the aforesaid type to provide valuable oil addition agents. The metals contemplated herein may be broadly classified as metals of groups I to VIII inclusive of the periodic system. These metals comprise the following: the alkali metals—lithium, sodium, potassium, rubidium and caesium; the alkaline earth group—beryllium, magnesium, calcium, strontium and barium; the metals zinc, cadmium, mercury, scandium; the metals aluminum, gallium, indium, thallium, titanium, zirconium, cerium, thorium, germanium, tin and lead; vanadium, columbium and tantalum; arsenic, antimony and bismuth; chromium, molybdenum, tungsten and uranium; rhenium, manganese, iron, cobalt and nickel; ruthenium, rhodium and palladium; osmium, iridium and platinum.

Some of the rare earth metals are given in the foregoing. Other rare earth metals suitable for use in the metal carboxylate group of these aryl ether sulfide condensation products are those now commercially available as the cerium and ythrium group, namely: a mixture of praseodymium, neodymium, samarium, europium, gadolinium, terbium, dypsprosium, holmium, erbium, thallium and lutecium.

The selection of a metal will, of course, depend to a certain extent upon the character of the oil in which the addition agent is to be added and the conditions under which it is to be used. Certain metals such as lead, zinc and tin, for example, may contribute to the oiliness characteristics of the oil. For use in addition agents for internal combustion engine lubricants my present work indicates tin as being a specially preferred metal.

As aforesaid, the aryl nucleus T may be mono or polycyclic corresponding, for example, to phenol, naphthol, anthrol and their derivatives. A typical condensation product in which the alkylated aryl ether acid salt groups are derived from alkylater phenol may, in its simplest form, be represented by the general formula:

II 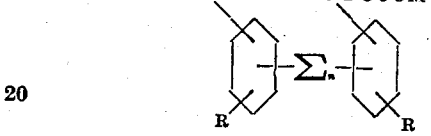

Since the condensation reaction employed in synthesizing the sulfides (or corresponding selenides or tellurides) may be attended by further condensation, such further condensed products (hereinafter termed "polymers") are contemplated herein as coming within the general Formula I and the terms "sulfides," "condensation products," etc., as used herein to identify these oil addition agents. Polymers of this character which may be associated with or formed instead of the simple condensation product of Formula II may be represented by the following formula:

III

Also, where synthesis of the condensation product employs, as an initial reactant, a wax substituted phenol obtained by the Friedel-Crafts condensation of phenol with a halogenated high molecular weight aliphatic material like petroleum wax, for example, such condensation may result in the formation of a "wax-phenol" in which two or more phenol groups are interconnected by one or more aliphatic hydrocarbon chains. Compounds of this type, when converted to the aryl ether acids and further reacted to form the sulfides of aryl ether acid salts, may result in the formation of condensation products corresponding to the formula:

IV or compounds of the formula

V in which the chains represent the aliphatic hydrocarbon group R of general Formula I.

The foregoing discussion pertaining to Formulae II to V is not intended as a development of the specific molecular composition or structure of condensation products constituting the mineral oil addition agents contemplated herein, but is merely intended as indicative of the possible composition of such addition agents. These addition agents may be broadly characterized as the sulfides (or the corresponding selenides or tellurides) of alkylated aryl ether acid salts or of alkylated aryl ether carboxylic acids in which the carboxyl hydrogen is substituted with its equivalent weight of metal. The sulfur condensation products may also be characterized as metal carboxylates of alkylated aryl ether acid sulfides or more specifically as metal carboxylates of alkylated-aroxy aliphatic acid sulfides; and metal carboxylates of alkylated-aroxy aromatic acid sulfides.

As aforesaid, the term "sulfide" as used herein is inclusive of the monosulfides, disulfides, trisulfides, tetrasulfides, etc.; that is, it includes both monosulfides and polysulfides, and it is also intended to include such polymers and related derivatives as may be formed by the hereinafter described procedures employed to illustrate the synthesis of the addition agents contemplated herein. It is also pointed out that the so-called polymer products typified by Formulae III to V are included under general Formula I since they are characterized by having therein at least one grouping typified by that general formula.

The sulfur derivatives or sulfides of the alkylated aryl ether acid salts are the preferred class of condensation products contemplated herein, and for that reason the invention will be specifically described in connection with these derivatives, although, as aforesaid, the corresponding selenides and tellurides are contemplated as coming within the scope of the broad inventive concept.

One general procedure for synthesizing the sulfides of alkylated aryl ether acid salts is to react the corresponding alkylated aryl ether acid with a sulfur halide followed by substitution of the carboxyl hydrogen with the desired metal. Another procedure of this type involves condensation of the alkali metal carboxylate of the alkylated aryl ether acid with a sulfur halide, whereby a sulfide of lighter color may be obtained. The sulfide of the alkylated aryl ether acid is then converted to the desired metal salt.

Another desirable procedure consists in conversion of a wax phenol or wax alkali phenate to the wax hydroxyl aryl sulfide, followed by introduction of the ether acid group. When Z is aromatic, however, the preceding procedures are preferred.

In the event sulfur dichloride ($SCl_2$) is used in the general procedures described above, the condensation product will be in the nature of a monosulfide (or polymer thereof); sulfur monochloride will yield the corresponding disulfide (or polymer thereof) and, of course, a mixture of sulfur halides may be employed to obtain a mixture of sulfides. Elementary sulfur may be employed as the condensation reagent, but this is not considered the most desirable procedure.

Sulfur derivatives of higher sulfur content may be obtained by reacting a condensation product having the disulfide linkage with alkali polysulfides or with an alkyl tetrasulfide. Such higher sulfur derivatives may also be obtained by first reducing the disulfide to form a thiophenol or aryl mercaptan of the alkylated aryl ether acid and then reacting the mercaptan with sulfur dichloride (to form the trisulfide) or with sulfur monochloride (to form the tetrasulfide).

The alkylated aryl ether acids and their alkali metal salts, used in preparing the sulfides may be obtained in various ways. The details in desirable procedures for preparing the alkali metal salts are described in the aforesaid co-pending application Serial No. 229,876 and details for synthesizing alkylated aryl ether acids are described in co-pending application Serial No. 226,911 filed August 26, 1938, in which I am also a co-inventor. A preferred procedure for forming the alkali carboxylates of aryl ether acids involves the following steps:

(1) A hydroxyaromatic compound, such as phenol is reacted with a halogenated high molecular weight aliphatic hydrocarbon or predominantly aliphatic material such as chlorinated petroleum wax in the presence of a Friedel-Crafts catalyst such as anhydrous aluminum chloride. The wax may be chlorinated to a chlorine content of from about ten percent to about twenty percent and the ratio of chlorinated wax to phenol in the reaction mixture, may, for example, be such that there are three atomic proportions of chlorine present in chlorwax of sixteen percent chlorine content to one molecular proportion of phenol. The reaction is carried out at elevated temperature preferably not to exceed 350° F. and the product purified to remove unreacted phenol. A wax substituted phenol obtained with a reaction mixture using three atomic proportions of chlorine of sixteen percent chlorine content to one mol of phenol is designated as wax phenol (3–16) and the ultimate products obtained therefrom may be characterized with a similar expression, such as "wax-sodium phenate (3–16)".

(2) An alkylated phenol of the type obtained according to the foregoing step may be converted to the corresponding wax substituted alkali metal phenate such as "wax-sodium phenate," by reaction with metallic sodium (or potassium) at elevated temperature, in the neighborhood of 500° F. in the presence of a non-oxidizing gas. The mixture should be rapidly stirred to produce finely divided sodium and thereby accelerate the reaction. The proportions of the reactant should be such that there is sufficient sodium present to substitute the hydroxyl hydrogen.

The alkylated alkali metal phenate can be prepared more conveniently, however, by reaction of the alkylated phenol with sodium alcoholate such as sodium butylate, by heating the mixture to about 300° F. and allowing the alcohol to distill.

(3) The aryl metal oxide or wax alkali phenate obtained by the foregoing step may be converted to a wax-phenoxy aliphatic acid alkali metal salt by reaction of the phenate with the alkali salt of a chlor (mono or poly basic) aliphatic acid. Alkali salts of diaryl ether acids (aroxy aromatic acid alkali metal salts) can be obtained by reacting the wax alkali phenate with a brom-aryl alkali carboxylate in the presence of a small percentage of powdered copper as a catalyst, the reaction mixture being heated to a temperature in the neighborhood of 400° F.

When it is desired to obtain a compound or condensation product in which the characterizing aryl nucleus contains, in addition to or instead of residual hydrogen, a substituent of the type classified in general Formula I as $Y_b$, it is pointed out that with the exception of substituents such as aralkyl, aryl, alkaryl, halogen, hydroxyl and aroxy, such Y groups are introduced after alkylation (step 1 above), and generally before introduction of the ether acid group. The usual methods for introduction of these substituents into non-alkylated hydroxyaromatic compounds may be employed in connection with the alkylated or wax substituted hydroxyaromatic compounds obtained in step 1. To those skilled in the art it will be apparent that the Y substituents are mainly derivatives of phenolic (—OH) groups. amino groups, aldehyde and keto groups, and carboxyl groups. Methods for the introduction of such base substituents along with —Z COOM groups will be apparent from methods described in the aforesaid co-pending applications Serial Numbers 222,755 and 229,876.

The alkali carboxylates of alkylated aryl ether acids of the type obtained according to the foregoing procedure can, if desired, be converted to the acid by acidifying with a mineral acid, or the alkali salts may, if desired, be converted directly to the sulfides as aforesaid.

The foregoing is merely a general description of preferred procedures which may be employed to obtain an initial reactant for making the sulfides of alkylated aryl ether acid salts. Other desirable procedures and further details may be obtained from the aforesaid co-pending applications.

Examples of the hydroxyaromatic compounds which may be used as the starting material in step 1 are: phenol, recorcinol, hydroquinone, catechol, cresol, xylenol, hydroxydiphenyl, benzylphenol, phenyl-ethyl-phenol, phenol resins, methyl-hydroxydiphenyl, alpha and beta naphthol, tolyl naphthol, anthrol and the like, with special preference given to phenol (hydroxy benzene) and alpha and beta naphthol. The chloraliphatic material employed in step 1 should contain at least twenty carbon atoms to obtain the preferred multifunctional products and chlorinated petroleum wax having a melting point not substantially less than about 120° F. is a preferred material to use in this reaction. These chlorinated aliphatic reactants may, however, be pure high molecular weight compounds capable of imparting oil miscibility to the product but preference is given to mixed high molecular weight hydrocarbons typified by those which characterize the heavier products of petroleum such as heavy petroleum oils of the lubricant type, petrolatum and crystalline petroleum wax or other predominantly aliphatic materials which will result in relatively long chain aliphatic substituents.

As an alternative procedure for effecting alkylation of the aryl nucleus I may employ unsaturated aliphatic hydrocarbons, preferably of high molecular weight such as eicosylene, cerotene, melene, etc., using $H_2SO_4$ $BF_3$ or $AlCl_3$ as a catalyst. Other sources for the heavy alkyl substituents are higher alcohols, preferably of at least twenty carbon chain lengths, such as ceryl alcohol, myricyl alcohol, etc. High molecular weight alcohols can be condensed with phenols directly in presence of $H_2SO_4$ or $AlCl_3$ as catalyst, but it is preferred to convert the alcohol to the corresponding halide (or polyhalide) and then condense the same with the hydroxyaromatic compound by the Friedel-Crafts reaction.

Examples of chloraliphatic acids (or alkali salts thereof) which may be used in step 3 above are those corresponding to acetic, propionic, butyric, caprylic, palmitic, stearic, etc.; and polybasic acids such as succinic, adipic, etc. Examples of aromatic acids which may be employed to obtain the alkylated aroxy-aromatic acids and salts in step 3 are brom benzoic acid and brom naphthoic acid.

In the event the alkylated aryl ether acid is obtained as the acid, the corresponding sulfides can be obtained by dissolving the alkylated aryl ether acid in a suitable solvent such as carbon disulfide, benzene, chlorbenzene, ethylene dichloride, Stoddard solvent, or the like. The temperature of the solution may be brought up to about 100° F. and the sulfur halide or mixture of sulfur halides added in the ratio of from about ½ to 1 mol of sulfur halide per mol of the alkylated aryl ether acid. The addition of the sulfur halide should be sufficiently slow to prevent the temperature substantially exceeding 100° F., and the mixture may be held at that temperature for about one hour to complete formation of the sulfur derivative. Hydrogen chloride is evolved in the reaction resulting in fixation of the sulfur in the aryl nucleus. As regards the temperature of the reaction it is to be understood that the reaction can be carried out at various temperatures from room temperature up to the boiling point of the solvent, but it is preferable for obtaining light colored products that the temperature be not too high. The mixture is water washed to remove dissolved hydrochloric acid and the free aryl ether acid is converted to its corresponding alkali salt by reaction with an alkali alcoholate. Salts of other metals are obtained by metathesis of the alkali salt with a normal inorganic or fatty acid salt or oxy salt of the desired metal, carrying out the reaction in aqueous or non-aqueous medium.

When the alkylated aryl ether acid starting material for sulfur condensation is obtained as the alkali carboxylate or alkali metal salt, the corresponding sulfide derivatives can be obtained by reacting with sulfur halide without first liberating the free acid and in this case free HCl is not evolved unless an amount of sulfur halide in excess of the sodium content is used, the HCl being converted to sodium chloride by reaction with the carboxylate alkali. When the alkali salt is used as an initial reactant the procedure is, in general, the same as that described above except that solvents such as carbon disulfide and ethylene dichloride should be replaced with solvents such as alcohol, benzene, or chlorbenzene to avoid side reactions with the alkali derivative.

When alkylated phenols (such as waxphenols) or the alkali salts thereof (such as wax-sodium phenate) are directly sulfurized before converting to the ether acid derivative, the sulfurization is carried out as outlined above, avoiding reactive solvents such as carbon disulfide and ethylene dichloride when the alkali salts are used.

Metal carboxylates of alkylated aryl ether acid sulfides can be made from the alkylated aryl ether acid sulfides obtained according to the foregoing procedures by reacting the anhydrous acid with the alcoholate of the desired metal; or by converting the free acid to an alkali salt and reacting the same with a soluble salt of the desired metal to form polyvalent metal salts by double decomposition.

Further details in typical procedures which may be followed in synthesizing the oil improving agents contemplated by this invention will appear from the following examples.

EXAMPLE ONE

*Metal carboxylates of wax phenoxy acetic acid disulfide* a. A solution of 27.5 grams of monochloracetic acid in 100 cc. of anhydrous ethanol was converted to sodium chloracetate by adding thereto a standard alcohol solution of sodium hydroxide, maintaining the temperature of the reaction mixture at about 100° F. This sodium chloracetate mixture was then added to a solution of 200 grams of wax sodium phenate (3–16) in 600 grams of mineral oil (Say. vis. of 67 sec. at 210° F.) and the mixture was stirred at 150° F. during a two hour period to form the wax-substituted phenoxy sodium acetate. The mixture was then sulfurized by lowering the temperature to about 100° F. and adding with rapid stirring 19.7 grams of sulfur monochloride at a rate sufficiently slow to avoid appreciable rise in the temperature of the mixture by the heat of reaction developed. The mixture was then stirred at this temperature about one hour to complete the sulfurization, followed by distilling the alcohol and water-washing or dry filtering the mixture to obtain the wax phenoxy acetic acid disulfide, which was approximately a ¼ blend in mineral oil.

b. A solution of 100 grams of wax-phenoxy acetic acid disulfide in about 300 grams of mineral oil as formed by the above procedure, was mixed with 3.35 grams of sodium, in solution in butanol as sodium butylate, followed by heating the mixture at about 200° F. for one hour to form the sodium salt of the wax phenoxy acetic acid disulfide. An alcohol solution of 13.8 grams of anhydrous stannous chloride was then added and the mixture was heated at about 200° F. for one hour, followed by distillation of the butanol to obtain the stannous salt. The reaction mixture was then filtered through "Hi Flo" to purify the product, which was approximately a ¼ blend of the stannous salt of wax phenoxy acetic acid disulfide in mineral oil.

c. By use of the above procedure, the cobaltous salt of wax phenoxy acetic acid disulfide was formed by substituting an eqivalent amount of cobaltous chloride for stannous chloride.

EXAMPLE TWO

*Metal carboxylates of wax-phenoxy benzoic acid disulfide* a. A solution of 100 grams of wax sodium phenate in 300 grams of mineral oil (oil of Say. vis. of 67 sec. at 210° F.), was mixed with 29 grams of brom sodium benzoid (Br.C₆H₄.COONa) and stirred at a reaction temperature of about 400° F. during a four hour period in the presence of copper powder as catalyst to form the sodium salt of wax-phenoxy benzoic acid. The free acid was obtained by treating the reaction product with aqueous hydrochloric acid, followed by water-washing and drying the mixture to obtain the purified product. The free acid was then diluted with one volume of chlorbenzene and converted to the sodium salt by adding one equivalent of sodium butylate and heating at about 200° F. for one hour before sulfurizing the mixture. The sulfurization was carried out by adding 9.8 grams of sulfur monochloride at about 100° F. at a rate sufficiently slow to avoid appreciable temperature rise by the heat of reaction developed, followed by stirring the mixture one hour at this temperture to complete the sulfurization. The product was purified by water-washing the mixture until the aqueous extract was neutral, followed by distillation of the chlorbenzene diluent to obtain the wax-phenoxy benzoic acid disulfide, which was approximately a ¼ blend in mineral oil.

b. The stannous salt of the wax-phenoxy benzoic acid disulfide was prepared by adding 0.85 gram of sodium in solution in butanol as sodium butylate, to 100 grams of the mineral oil blend of the free acid prepared as described above, followed by adding an alcohol solution of 3.47 grams of anhydrous stannous chloride. The mixture was then heated to the reflux temperature (about 225° F.) for one hour, followed by distillation of the alcohol to obtain the stannous salt concentrate in mineral oil. The mixture was then filtered through "Hi Flo" and steam treated at 300° F. until all traces of alcohol were removed to obtain the finished product.

To demonstrate the improved properties obtained in mineral oil blends containing addition agents of the type discussed herein, I have conducted several comparative tests with representative mineral oils alone and with the same oils blended with representative metal carboxylates of alkylated aryl ether acid sulfides. The results of such tests are discussed in the following examples.

EXAMPLE A

*Pour point depression*

These tests were conducted with a motor oil having a Saybolt viscosity of 67 seconds at 210° F. and a pour point of +20° F. The pour points of blends formed from this oil and representative metal carboxylates of wax substituted aryl ether acid sulfides or sulfides of alkylated aryl ether acid metal salts are listed in Table I below, from which it will be observed that the addition agents contemplated herein are effective pour point depressants when the aryl nucleus is substituted with petroleum wax.

*Table I*

| Addition agent | A. S. T. M. pour point, per cent depressant | | | |
|---|---|---|---|---|
|  | 0% | ¹⁄₁₆% | ⅛% | ¼% |
|  | °F. | °F. | °F. | °F. |
| Stannous carboxylate of wax-phenoxy acetic acid disulfide (3–19) | +20 | -------- | -10 | -20 |
| Cobaltous carboxylate of wax-phenoxy acetic acid disulfide (3–16) | +20 | -10 | -15 | -------- |
| Stannous carboxylate of wax-phenoxy benzoic acid disulfide (3–16) | -------- | -10 | -15 | -------- |

EXAMPLE B

*Viscosity index improvement*

The data listed in Table II below showing the effectiveness of typical addition agents contemplated herein for improving viscosity index (V. I.) were obtained in the conventional manner from the Saybolt viscosity (Say. vis.) of the oil and the oil blends at 100° F. and 210° F. The oil used was a viscous mineral oil of the lubricant type.

Table II

| Addition agent | Conc. by wt. | Say. vis. 100° F. | Say. vis. 210° F. | V. I. |
|---|---|---|---|---|
| | Per cent | | | |
| None | | 140.5 | 41.7 | 74.5 |
| Stannous carboxylate of wax phenoxy acetic acid disulfide (3-19) | 1 | 163 | 44 | 97.8 |
| Cobaltous carboxylate of wax phenoxy acetic acid disulfide (3-16) | 1 | 151.9 | 42.76 | 85.2 |
| Stannous carboxylate of wax phenoxy benzoic acid disulfide (3-16) | 1 | 152.7 | 42.92 | 88.2 |

Example C

Oxidation inhibition

In addition to the foregoing tests I have also made comparative tests between an oil and an oil blend containing representative improving agents of the type contemplated herein to determine the comparative behavior of the unblended oil and the improved oil under actual operating conditions. The tests were carried out in a single cylinder Lauson engine operated continuously over a time interval of sixteen hours with the cooling medium held at a temperature of about 212° F. and the oil temperature held at about 280° F. The engine was operated at a speed of about 1830 R. P. M.

The oil used in the test was a lubricating oil stock of 45 sec. Saybolt viscosity at 210° F. and the conditions observed were:

a. The amount of naphtha insoluble material formed in the oil.
b. The neutralization number or acidity (N. N.) of the oil.
c. The S. U. V. of the oil before and after the test.

In running these tests, comparative runs were made with a sample of the blank oil and a sample of the same oil containing the addition agent. In Table III below, the blank oil sample is indicated by A; and the oil with addition agent used in the corresponding run is indicated by B. The oil blend contained as addition agent:

½% stannous salt of wax-phenoxy acetic acid disulfide (3-19).

Table III

| Oil | S. U. V. at 210° F. | N. N. | Per cent naphtha insolubles |
|---|---|---|---|
| A | 61.2 | 13.0 | 0.31 |
| B | 48.8 | 1.7 | 0.44 |

The amount of improving agent used in the oil may be varied, depending upon the character of the oil with which it is blended and the properties desired in the final oil composition. The sulfides of alkylated aryl ether acid metal salts contemplated herein may be used in amounts ranging from 1/10 per cent to 10 per cent and in general mineral oil compositions of the desired improved properties may be obtained with amounts in the neighborhood of 1 per cent by weight.

It is to be understood that while I have described certain preferred procedures which may be followed in the preparation of the sulfides of alkylated aryl ether acid salts contemplated herein as oil-improving agents and have referred to various representative constituents of these improving agents, such procedures and constituents are for illustrative purposes only. The invention, therefore, is not to be considered as limited by the specific examples given but includes within its scope such changes and modifications as fairly come within the spirit of the appended claims.

I claim:

1. An improved mineral oil composition comprising a mineral oil having admixed therewith a minor proportion of an oil miscible sulfide of a wax substituted aryl ether carboxylic acid salt in which the carboxyl hydrogen is substituted with its equivalent weight of metal.

2. An improved mineral oil composition comprising a mineral oil having admixed therewith a minor proportion of an oil miscible monosulfide of a wax substituted aryl ether carboxylic acid salt in which the carboxyl hydrogen is substituted with its equivalent weight of metal.

3. An improved mineral oil composition comprising a mineral oil having admixed therewith a minor proportion of an oil miscible disulfide of a wax substituted aryl ether carboxylic acid salt in which the carboxyl hydrogen is substituted with its equivalent weight of metal.

4. An improved mineral oil composition comprising a mineral oil having admixed therewith a minor proportion of an oil miscible sulfide of a wax substituted aroxy aliphatic carboxylic acid salt in which the carboxyl hydrogen is substituted with its equivalent weight of metal.

5. An improved mineral oil composition comprising a mineral oil having admixed therewith a minor proportion of an oil miscible sulfide of a wax substituted aroxy aromatic carboxylic acid salt in which the carboxyl hydrogen is substituted with its equivalent weight of metal.

6. An improved mineral oil composition comprising a mineral oil having admixed therewith a minor proportion of an oil miscible metal carboxylate of wax phenoxy acetic acid disulfide.

7. An improved mineral oil composition comprising a mineral oil having admixed therewith in minor proportion from about 1/10 percent to about 10 percent, an oil miscible sulfide of a wax substituted aryl ether carboxylic acid salt in which the carboxyl hydrogen is substituted with its equivalent weight of metal.

8. An improved mineral oil composition comprising a mineral oil having admixed therewith a minor proportion of a metalorganic condensation product characterized by having at least once therein the grouping corresponding to the general formula

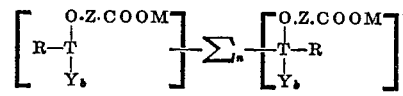

in which T represents an aromatic nucleus; R represents at least one alkyl group having at least twenty carbon atoms; O·Z·COOM represents an ether acid salt group wherein Z represents a radical selected from the group consisting of alkyl and aryl radicals and M represents the hydrogen equivalent of a metal; Y is selected from the group consisting of hydrogen, hydroxyl, ester, keto, alkoxy, alkyl sulfide, aryl sulfide, aroxy, ether alcohol, aldehyde, thio aldehyde, oxime, amido, thioamido, carbamido, aralkyl, aryl, alkaryl, halogen, nitroso, nitrosamino, amidino, imino, N-thio, diazo, hydrazino, cyano, azoxy, azo and hydrazo radicals; $b$ represents the number of Ys and is equal to zero or a whole number corresponding to available hydrogens on the nucleus T not substituted with R, —O·Z·COOM and $\Sigma_n$; $\Sigma$ represents an element selected from the group consisting of sulfur, selenium and tellurium; and $n$ represents a whole number from one to four.

9. An improved mineral oil composition comprising a mineral oil having admixed therewith a minor proportion of the stannous carboxylate of wax-phenoxy-acetic acid disulfide.

10. An improved mineral oil composition comprising a mineral oil having admixed therewith in minor proportion an oil-miscible condensation product characterized by at least two aryl nuclei, each of which is substituted with at least one alkyl group and with at least one ether carboxylic acid group wherein the carboxyl hydrogen is substituted with metal, the said characterizing nuclei being interconnected by at least one atom of an element selected from the group consisting of sulfur, selenium, and tellurium, the said alkyl substituents being aliphatic hydrocarbon groups of at least twenty carbon atoms.

ORLAND M. REIFF.

CERTIFICATE OF CORRECTION.

Patent No. 2,319,190.  May 11, 1943.

ORLAND M. REIFF.

It is hereby certified that error appears in the printed specification of the above numbered patent requiring correction as follows: Page 1, second column, line 5, for "is" read --its--; page 5, first column, line 62, for "benzoid" read --benzoate--; and that the said Letters Patent should be read with this correction therein that the same may conform to the record of the case in the Patent Office.

Signed and sealed this 20th day of July, A. D. 1943.

(Seal)
Henry Van Arsdale,
Acting Commissioner of Patents.

CERTIFICATE OF CORRECTION.

Patent No. 2,319,190.　　　　　　　　　　　　　May 11, 1943.

ORLAND M. REIFF.

It is hereby certified that error appears in the printed specification of the above numbered patent requiring correction as follows: Page 1, second column, line 5, for "is" read --its--; page 5, first column, line 62, for "benzoid" read --benzoate--; and that the said Letters Patent should be read with this correction therein that the same may conform to the record of the case in the Patent Office.

Signed and sealed this 20th day of July, A. D. 1943.

(Seal)　　　　　　　　　　　　　　　　　　　Henry Van Arsdale,
　　　　　　　　　　　　　　　　　　　Acting Commissioner of Patents.